(12) United States Patent
Cheon et al.

(10) Patent No.: US 8,649,431 B2
(45) Date of Patent: Feb. 11, 2014

(54) METHOD AND APPARATUS FOR ENCODING AND DECODING IMAGE BY USING FILTERED PREDICTION BLOCK

(75) Inventors: Min-su Cheon, Suwon-si (KR); Jung-hye Min, Yongin-si (KR); Hae-kyung Jung, Seoul (KR); Woo-jin Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 687 days.

(21) Appl. No.: 12/391,518

(22) Filed: Feb. 24, 2009

(65) Prior Publication Data

US 2009/0225842 A1   Sep. 10, 2009

(30) Foreign Application Priority Data

Mar. 4, 2008  (KR) ........................ 10-2008-0020073

(51) Int. Cl.
*H04B 1/66* (2006.01)

(52) U.S. Cl.
USPC .................................... 375/240.03

(58) Field of Classification Search
USPC ................................. 375/240–241
See application file for complete search history.

(56) References Cited

U.S. PATENT DOCUMENTS

| | | | | |
|---|---|---|---|---|
| 7,738,561 | B2 * | 6/2010 | Huang et al. | 375/240.27 |
| 2004/0184666 | A1 * | 9/2004 | Sekiguchi et al. | 382/236 |
| 2005/0232359 | A1 | 10/2005 | Cha | |
| 2006/0227881 | A1 * | 10/2006 | Gordon | 375/240.25 |
| 2006/0280372 | A1 * | 12/2006 | Han | 382/240 |
| 2006/0285590 | A1 * | 12/2006 | Guleryuz | 375/240.12 |
| 2007/0014365 | A1 * | 1/2007 | MacInnis | 375/240.16 |
| 2007/0064798 | A1 * | 3/2007 | Paniconi et al. | 375/240.12 |
| 2009/0238276 | A1 * | 9/2009 | Har-Noy et al. | 375/240.13 |

FOREIGN PATENT DOCUMENTS

| | | |
|---|---|---|
| JP | 10-210469 A | 8/1998 |
| JP | 2006-157083 A | 6/2006 |
| KR | 10-0770726 B1 | 10/2007 |
| WO | 01/52411 A2 | 7/2001 |

OTHER PUBLICATIONS

Roth, Stefan, et al, "Fields of Experts: A Framework for Learning Image Priors," Department of Computer Science, Brown University, Providence, RI, 8 pages.

* cited by examiner

*Primary Examiner* — Ricky Ngo
*Assistant Examiner* — Wei-Po Kao
(74) *Attorney, Agent, or Firm* — Sughrue Mion, PLLC (57) ABSTRACT

A prediction block of a current block is created by performing intra prediction or inter prediction on the current block. The prediction block is filtered by using a predetermined filter. The current block is encoded based on the filtered prediction block. A compression rate of image encoding may be substantially improved by more accurately performing a prediction encoding.

10 Claims, 5 Drawing Sheets

| 0.1299 | 0.1307 | 0.1314 | 0.1314 | 0.1312 |
| --- | --- | --- | --- | --- |
| 0.1302 | 0.1310 | 0.1315 | 0.1310 | 0.1311 |
| 0.1292 | 0.1298 | 0.1299 | 0.1298 | 0.1300 |
| 0.1289 | 0.290 | 0.1289 | 0.1287 | 0.1286 |
| 0.1281 | 0.1287 | 0.1287 | 0.1284 | 0.1281 |

METHOD AND APPARATUS FOR ENCODING AND DECODING IMAGE BY USING FILTERED PREDICTION BLOCK

CROSS-REFERENCE TO RELATED PATENT APPLICATION

This application claims the benefit from Korean Patent Application No. 10-2008-0020073, filed on Mar. 4, 2008, in the Korean Intellectual Property Office, the disclosure of which is incorporated herein in its entirety by reference.

BACKGROUND

1. Field of the Invention

The present invention relates to encoding and decoding an image, and more particularly, to encoding and decoding an image by accurately predicting a current block.

2. Description of the Related Art

In accordance with image compression standards such as Moving Picture Experts Group (MPEG)-1 standards, MPEG-2 standards, MPEG-4H.264/MPEG-4 advanced video coding (AVC) standards, a picture is divided into predetermined image processing units, for example, macro blocks to encode an image. Each macro block is encoded by performing inter prediction or intra prediction on the macro block. An optimal encoding mode is selected in consideration of a data size and a degree of distortion of an original macro block. The macro block is encoded by using the selected encoding mode.

The intra prediction is performed not by referring to a reference picture to encode current blocks, but by using values of neighboring pixels which are spatially adjacent to a current block to be encoded. The intra prediction is performed on the current block in a predetermined intra prediction direction by using the values of the neighboring pixels. Thus, a prediction block of the current block is created. Then, a residual block is created by subtracting the prediction block from the current block. Discrete cosine transformation (DCT) is performed on the residual block to create discrete cosine coefficients and the discrete cosine coefficients are quantized to create a predetermined bitstream. By encoding only the residual block, a compression rate of image encoding is improved. Various intra prediction modes may be used in accordance with a size and a prediction direction of a block on which the intra prediction is performed.

The inter prediction is a method of compressing an image by removing temporal redundancies between pictures. A representative example of the inter prediction is a motion estimation encoding method. In the motion estimation encoding method, a motion vector of a current block is estimated by using at least one reference picture. A prediction block of the current block is created in accordance with an estimation result.

In the motion estimation encoding method, the most similar block to the current block is searched in a determined detection range of the reference picture, by using a predetermined valuation function. For example, a block that has the smallest sum of absolute differences (SAD) to the current block is detected from the reference picture. The detected block is used as the prediction block of the current block. Then, as in the intra prediction, a residual block is created by subtracting the prediction block from the current block. Various sizes of blocks such as 16×16 blocks, 8×16 blocks, and 8×8 blocks may be used as basic units of motion estimation.

As described above, when intra prediction or inter prediction is performed, a residual block, created based on a prediction block, is encoded. Thus, the more similar the prediction block and a current block are, the more substantial improvement may be accomplished in a compression rate of image encoding.

SUMMARY

The present invention provides methods and apparatuses for encoding and decoding an image by accurately predicting a current block.

According to an exemplary aspect of the present invention, there is provided a method of encoding an image, the method including creating a prediction block of a current block by performing intra prediction or inter prediction on the current block; filtering the prediction block by using a predetermined filter; and encoding the current block based on the filtered prediction block.

The filtering may include repeatedly filtering the prediction block by using n filters.

The n filters may be determined from a natural image in accordance with a field of experts (FoE) model.

The n filters may have a size of 3×3 or 5×5.

The filtering may include repeatedly filtering the prediction block and a previously encoded region which is adjacent to the current block, by using n filters.

According to another exemplary aspect of the present invention, there is provided a method of decoding an image, the method including creating a prediction block of a current block by performing intra prediction or inter prediction on the current block; filtering the prediction block by using a predetermined filter; and restoring the current block by adding the filtered prediction block to a residual block of the current block.

According to another exemplary aspect of the present invention, there is provided an apparatus for encoding an image, the apparatus including a prediction unit for creating a prediction block of a current block by performing intra prediction or inter prediction on the current block; a preprocessing unit for filtering the prediction block by using a predetermined filter; and an encoding unit for encoding the current block based on the filtered prediction block.

The preprocessing unit may repeatedly filter the prediction block by using n filters.

The preprocessing unit may repeatedly filter the prediction block and a previously encoded region which is adjacent to the current block, by using n filters.

According to another exemplary aspect of the present invention, there is provided an apparatus for decoding an image, the apparatus including a prediction unit for creating a prediction block of a current block by performing intra prediction or inter prediction on the current block; a preprocessing unit for filtering the prediction block by using a predetermined filter; and a restoring unit for restoring the current block by adding the filtered prediction block to a residual block of the current block.

According to another exemplary aspect of the present invention, there is provided a computer readable recording medium having recorded thereon a computer program for executing the method of encoding or decoding an image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

The present invention will be described in detail by explaining exemplary embodiments of the invention with reference to the attached drawings.

Figure 1:
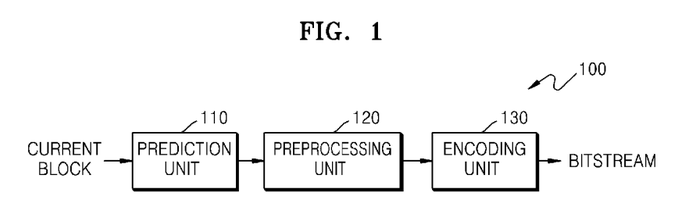
FIG. 1 is a block diagram of an image encoding apparatus, according to an exemplary embodiment of the present invention.

FIG. 1 is a block diagram of an image encoding apparatus 100 according to an exemplary embodiment of the present invention.

Referring to FIG. 1, the image encoding apparatus 100 according to this exemplary embodiment of the present invention includes a prediction unit 110, a preprocessing unit 120, and an encoding unit 130.

The prediction unit 110 predicts a current block by performing intra prediction or inter prediction on the current block. The current block is a block that is currently being encoded by the image encoding apparatus 100 and may have various sizes such as 4×4, 8×8, 8×4, 4×8, and 16×16. As a result of prediction that is performed by the prediction unit 110, a prediction block of the current block is created.

The preprocessing unit 120 filters the prediction block created by the prediction unit 110, by using a predetermined filter so that the prediction block becomes more similar to the current block.

The prediction block may be repeatedly filtered by using n (n≥1) filters. The prediction block may be filtered n times by using all of the n filters or may be filtered k (k<n) times by using k filters from the n filters. A method of determining a filter is not restricted. For example, a filter that is determined from a natural image by using a field of experts (FoE) model may be used.

Figure 2:
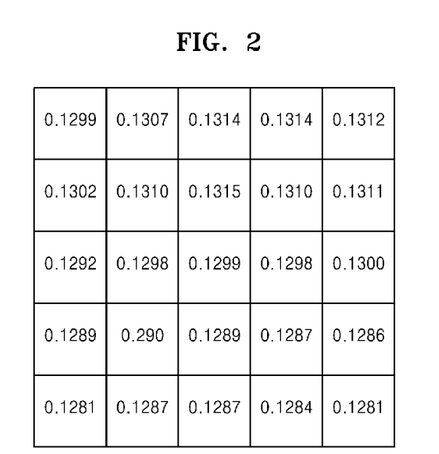
FIG. 2 is a table of filter coefficients according to an exemplary embodiment of the present invention.

FIG. 2 is a table of filter coefficients according to an exemplary embodiment of the present invention. In FIG. 2, a 5×5 filter that is determined in accordance with an FoE model is used.

The FoE model is used for denoising and inpainting. The FoE model analyzes a pattern by using a sufficient amount of data of a natural image and predicts a value of a predetermined pixel from the value of a neighboring pixel by using the analyzed pattern. The natural image is a raw image that is not compressed. A filter to be used to encode and decode an image is determined in advance by analyzing the sufficient amount of the data of the natural image in which compression loss does not occur.

The natural image may have a large number of patterns. The same number of filters corresponding to the patterns may exist. In the exemplary embodiment, a current block may be filtered by using k filters, which are determined from the n number of filters. The current block is repeatedly filtered by using the n or k filters which are determined by using the FoE model.

As described above, an image compression encoding method divides a current picture into blocks having a predetermined size and performs prediction encoding on the blocks. Because the prediction encoding is performed in block units, unlike a natural image, prediction blocks may include blocking artifacts which represent noise. Thus, noise, such as the blocking artifacts, is removed by filtering the prediction blocks by using filters which are determined in accordance with the FoE model.

The filters to be used for filtering may have various sizes such as 3×3 and 5×5. The prediction block is filtered by using an optimal filter that is selected in consideration of the size and filtering time of a prediction block. Also, to remove the blocking artifacts more efficiently, another region in addition to the prediction block may be filtered.

Figure 3:
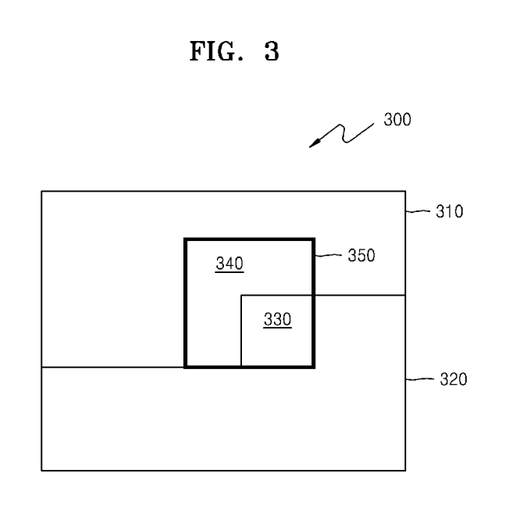
FIG. 3 is a diagram illustrating a filtering region according to an exemplary embodiment of the present invention.

FIG. 3 is a diagram illustrating a filtering region 350 according to an exemplary embodiment of the present invention. FIG. 3 will be described in conjunction with FIG. 1.

Referring to FIG. 3, a current picture 300 is divided into a previously encoded region 310 and a not-yet-encoded region 320. The preprocessing unit 120 filters the filtering region 350 including pixels 340 which are adjacent to a prediction block 330 and are included in the previously encoded region 310, and also the prediction block 330.

As described above with reference to FIG. 2, the prediction block 330 may include blocking artifacts which are created when an image is compressed and encoded in block units. Thus, to remove the blocking artifacts, the filtering region 350 including the pixels 340 which are adjacent to the prediction block 330 and are included in the previously encoded region 310, and the prediction block 330, may be filtered by using filters which are determined in accordance with an FoE model.

Referring back to FIG. 1, the encoding unit 130 encodes the current block based on the prediction block filtered by the preprocessing unit 120. The encoding unit 130 creates a residual block by subtracting the filtered prediction block from the current block. The encoding unit 130 creates discrete cosine coefficients by performing discrete cosine transformation (DCT) on the residual block, quantizes and entropy-encodes the discrete cosine coefficients to create a bitstream.

Figure 4:
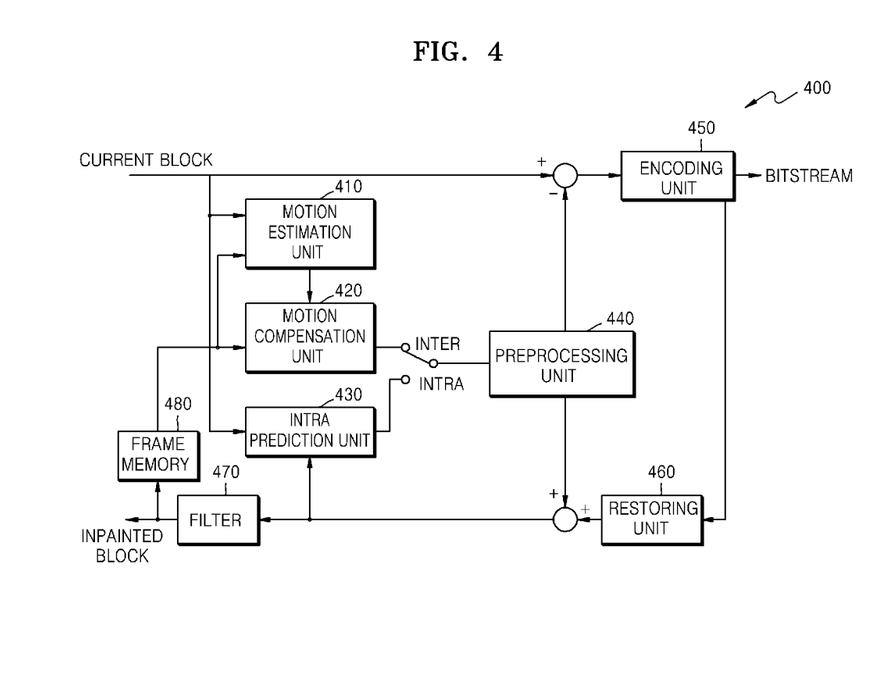
FIG. 4 is a block diagram of an image encoding apparatus, according to another exemplary embodiment of the present invention.

FIG. 4 is a block diagram of an image encoding apparatus 400 according to another exemplary embodiment of the present invention.

Referring to FIG. 4, the image encoding apparatus 400 according to the exemplary embodiment of the present invention includes a motion estimation unit 410, a motion compensation unit 420, an intra prediction unit 430, a preprocessing unit 440, an encoding unit 450, a restoring unit 460, a filter 470, and a frame memory 480. The motion estimation unit 410, the motion compensation unit 420 and the intra prediction unit 430 correspond to the prediction unit 110, the preprocessing unit 440 corresponds to the preprocessing unit 120 and the encoding unit 450 corresponds to the encoding unit 130 illustrated in FIG. 1.

The motion estimation unit 410 and the motion compensation unit 420 detect a reference picture that is stored in the frame memory 480 and perform inter prediction on a current block. The motion estimation unit 410 searches the reference picture by using the current block and estimates a motion vector of the current block. The motion estimation unit 410 estimates the motion vector by searching a reference block that has the smallest sum of absolute differences (SAD) in relation to the current block from the reference picture, and by calculating a relative position difference between the current block and the searched reference block.

The motion compensation unit 420 predicts the current block in accordance with the motion vector estimated by the motion estimation unit 410 and creates a prediction block. The reference block detected by the motion estimation unit 410 is used as the prediction block of the current block.

The intra prediction unit 430 performs intra prediction on the current block by using pixels which are adjacent to the current block and are included in a previously encoded region. As described above, the intra prediction unit 430 performs the intra prediction on the current block in a predetermined intra prediction direction based on the pixels which are adjacent to the current block and are included in the previously encoded region.

The preprocessing unit 440 filters the prediction block created by the motion compensation unit 420 and the intra prediction unit 430, by using a predetermined filter. As described above with reference to FIG. 2, the predetermined filter may be determined from a natural image by using an FoE model. The predetermined filter may include n filters which are determined in accordance with the FoE model. In this case, the prediction block is repeatedly filtered by the n filters. A filtering region including pixels which are adjacent to the prediction block and are included in a previously encoded region may also be filtered.

The encoding unit 450 encodes the current block based on the prediction block filtered by the preprocessing unit 440. The encoding unit 450 creates a residual block by subtracting the filtered prediction block from the current block and creates discrete cosine coefficients by performing DCT on the residual block. The encoding unit 450 quantizes and entropy-encodes the discrete cosine coefficients to create a bitstream.

The restoring unit 460 restores the residual block by performing inverse quantization and inverse discrete cosine transformation (IDCT) on the discrete cosine coefficients which are quantized by the encoding unit 450. The restoring unit 460 restores the current block by adding the restored residual block to the prediction block that is filtered by the preprocessing unit 440. The restored current block is deblocking-filtered by the filter 470 and is stored in the frame memory 480 to be used when a subsequent block or a subsequent picture is predicted.

Figure 5:
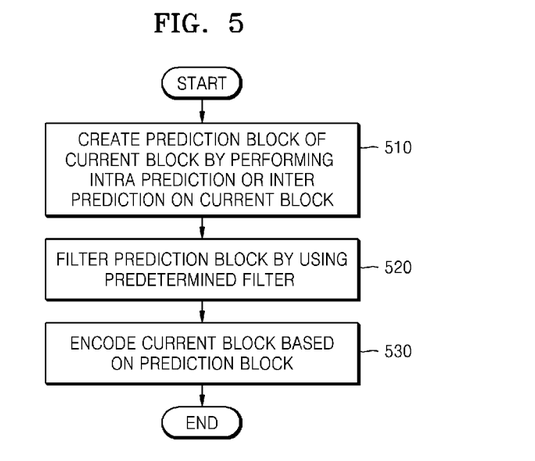
FIG. 5 is a flowchart of an image encoding method according to an exemplary embodiment of the present invention.

FIG. 5 is a flowchart of an image encoding method according to an exemplary embodiment of the present invention.

Referring to FIG. 5, in operation 510, an image encoding apparatus according to an exemplary embodiment of the present invention creates a prediction block of a current block by performing intra prediction or inter prediction on the current block to perform prediction encoding on the current block.

In operation 520, the image encoding apparatus filters the prediction block by using a predetermined filter. The predetermined filter may include n filters which are determined in accordance with an FoE model. For example, the prediction block is repeatedly filtered by using the n filters. The n filters may have various sizes such as 3×3 and 5×5. A filtering region to be filtered may include pixels which are adjacent to the prediction block.

In operation 530, the image encoding apparatus encodes the current block based on the filtered prediction block. The image encoding apparatus creates a residual block by subtracting the filtered prediction block from the current block. The image encoding apparatus creates discrete cosine coefficients by performing DCT on the residual block. The image encoding apparatus quantizes and entropy-encodes the discrete cosine coefficients to create a bitstream.

Figure 6:
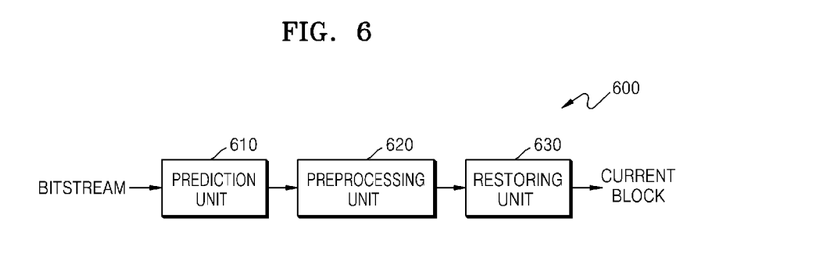
FIG. 6 is a block diagram of an image decoding apparatus, according to an exemplary embodiment of the present invention.

FIG. 6 is a block diagram of an image decoding apparatus 600, according to an exemplary embodiment of the present invention.

Referring to FIG. 6, the image decoding apparatus 600 includes a prediction unit 610, a preprocessing unit 620, and a restoring unit 630.

The prediction unit 610 predicts a current block based on information on a prediction mode of the current block, which is included in a bitstream, to create a prediction block. The prediction unit 610 predicts the current block by performing intra prediction or inter prediction on the current block. The prediction unit 610 performs the intra prediction based on information on an intra prediction direction, which is included in the bitstream, or performs the inter prediction based on information on a motion vector, which is included in the bitstream.

The preprocessing unit 620 filters the prediction block by using a predetermined filter. The predetermined filter may be the same filter which is used for the image encoding. The predetermined filter is determined from a natural image in accordance with an FoE model. The predetermined filter may include n filters which are determined in accordance with the FoE model and may have various sizes, such as 3×3 and 5×5. To remove blocking artifacts created in the prediction block, a filtering region may be extended so that pixels which are adjacent to the prediction block and are included in a previously decoded region may also be filtered.

The restoring unit 630 restores the current block based on the filtered prediction block. The restoring unit 630 restores the current block by adding the filtered prediction block to a residual block that is decoded from the bitstream.

Figure 7:
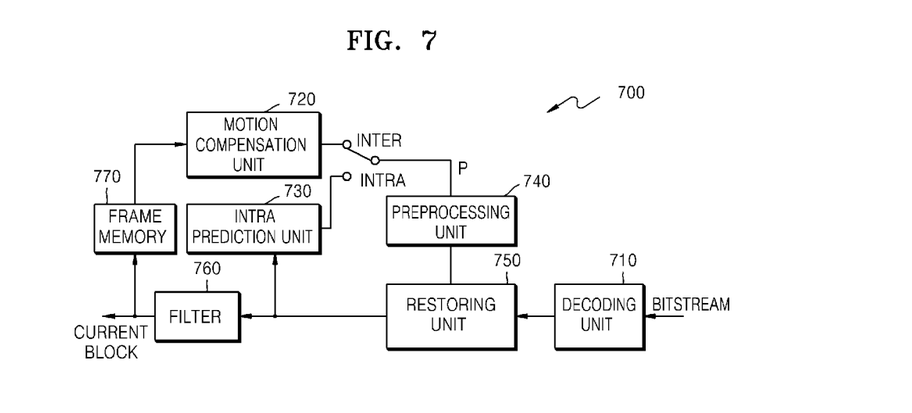
FIG. 7 is a block diagram of an image decoding apparatus, according to another exemplary embodiment of the present invention.

FIG. 7 is a block diagram of an image decoding apparatus 700, according to another exemplary embodiment of the present invention.

Referring to FIG. 7, the image decoding apparatus 700 according to this exemplary embodiment of the present invention includes a decoding unit 710, a motion compensation unit 720, an intra prediction unit 730, a preprocessing unit 740, a restoring unit 750, a filter 760, and a frame memory 770.

The motion compensation unit 720 and the intra prediction unit 730 correspond to the prediction unit 610, the preprocessing unit 740 corresponds to the preprocessing unit 620, and the restoring unit 750 corresponds to the restoring unit 630 illustrated in FIG. 6.

The decoding unit 710 receives a bitstream including data on a current block and restores a residual block of the current block by decoding the received bitstream. The decoding unit 710 restores quantized discrete cosine coefficients by entropy-decoding the data on the current block and restores the residual block by performing IDCT on the discrete cosine coefficients.

Also, the decoding unit 710 decodes information on a prediction mode of the current block. If the current block has been encoded in an intra prediction mode, the decoding unit 710 decodes information on an intra prediction direction. If the current block has been encoded in an inter prediction mode, the decoding unit 710 decodes information on a motion vector of the current block.

The motion compensation unit 720 performs inter prediction on the current block by searching a reference picture that is stored in the frame memory 770, based on the information on the motion vector, which is decoded by the decoding unit

710. A prediction block of the current block is determined from the reference picture, in accordance with the motion vector.

The intra prediction unit 730 performs intra prediction on the current block based on the information on the intra prediction direction, which is decoded by the decoding unit 710. The intra prediction is performed in a predetermined prediction direction by using pixels which are adjacent to the current block and are included in a previously decoded region.

The preprocessing unit 740 filters the prediction block that is created by the motion compensation unit 720 or the intra prediction unit 730, by using a predetermined filter. As described above with reference to FIGS. 1 through 6, the predetermined filter may be determined from a natural image in accordance with an FoE model. The predetermined filter may include n filters which are determined in accordance with the FoE model. For example, the prediction block is repeatedly filtered by using the n filters. A filtering region including pixels which are adjacent to the prediction block and are included in a previously decoded region may be filtered.

The restoring unit 750 restores the current block by adding the residual block that is restored by the decoding unit 710 to the prediction block that is filtered by the preprocessing unit 740. The restored current block is deblocking-filtered by the filter 760 and is stored in the frame memory 770 in order to be used when a subsequent block or a subsequent picture is predicted.

Figure 8:
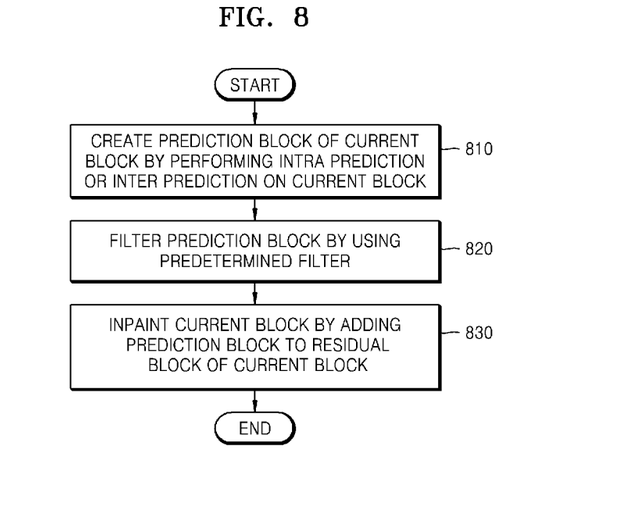
FIG. 8 is a flowchart of an image decoding method according to an exemplary embodiment of the present invention.

FIG. 8 is a flowchart of an image decoding method according to an exemplary embodiment of the present invention.

Referring to FIG. 8, in operation 810, an image decoding apparatus according to an exemplary embodiment of the present invention creates a prediction block of a current block by performing intra prediction or inter prediction on the current block, based on information on an intra prediction direction or information on a motion vector, which is included in a bitstream.

In operation 820, the image decoding apparatus filters the prediction block by using a predetermined filter. The predetermined filter may include n filters which are determined in accordance with an FoE model. For example, the prediction block is repeatedly filtered by using the n filters. The n filters may have various sizes such as 3×3 and 5×5 and a filtering region to be filtered may include pixels which are adjacent to the prediction block.

In operation 830, the image decoding apparatus restores the current block by adding the filtered prediction block to a residual block of the current block, which is decoded from the bitstream.

As described above, according to the present invention, a compression rate of image prediction encoding may be improved by filtering a prediction block created by performing intra prediction or inter prediction on a current block to make the prediction block substantially similar to the current block and by creating a residual block by using the filtered prediction block.

The invention may also be embodied as computer-readable codes on a computer-readable recording medium. The computer-readable recording medium may be any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A method of encoding an image comprising:
creating a prediction block of a current block by performing one of intra prediction and inter prediction on the current block;
determining n filters from a natural image based on a predetermined model;
filtering the prediction block and pixels adjacent to the prediction block and included in a previously encoded region which is adjacent to the current block, to remove blocking artifacts from the prediction block, with the n filters, to obtain a filtered prediction block; and
encoding the current block based on the filtered prediction block,
wherein the natural image is comprised of a number of patterns,
the number of n filters corresponds to the number of patterns in the natural image, and
the filtering comprises repeatedly filtering the prediction block and the adjacent pixels with the n filters.

2. The method of claim 1, wherein the n filters comprise at least one of a 3×3 filter and a 5×5 filter.

3. A non-transitory computer-readable recording medium having recorded thereon a computer program which, when executed by a computer, causes the computer to execute the method of claim 1.

4. A method of decoding an image comprising:
creating a prediction block of a current block by performing one of intra prediction and inter prediction on the current block;
determining n filters from a natural image based on a predetermined model;
filtering the prediction block and pixels adjacent to the prediction block and included in a previously decoded region which is adjacent to the current block, to remove blocking artifacts from the prediction block, with the n filters, to obtain a filtered prediction block; and
restoring the current block by adding the filtered prediction block to a residual block of the current block,
wherein the natural image is comprised of a number of patterns,
the number of n filters corresponds to the number of patterns in the natural image, and
the filtering comprises repeatedly filtering the prediction block and the adjacent pixels with the n filters.

5. The method of claim 4, wherein the n filters comprise at least one of a 3×3 filter and a 5×5 filter.

6. A non-transitory computer-readable recording medium having recorded thereon a computer program which, when executed by a computer, causes the computer to execute the method of claim 4.

7. An apparatus for encoding an image comprising:
a prediction unit configured to create a prediction block of a current block by performing one of intra prediction and inter prediction on the current block;
a preprocessing unit configured to filter the prediction block and pixels adjacent to the prediction block and included in a previously encoded region which is adjacent to the current block, to remove blocking artifacts from the prediction block, with n filters determined from a natural image, and obtain a filtered prediction block; and an encoding unit configured to encode the current block based on the filtered prediction block, wherein the n filters are determined from the natural image based on a predetermined model, the natural image is comprised of a number of patterns, the number of n filters corresponds to the number of patterns in the natural image, and the preprocessing unit repeatedly filtering the prediction block and the adjacent pixels with the n filters.

8. The apparatus of claim 7, wherein the n filters comprise at least one of a 3×3 filter and a 5×5 filter.

9. An apparatus for decoding an image comprising:

a prediction unit configured to create a prediction block of a current block by performing one of intra prediction and inter prediction on the current block;

a preprocessing unit configured to filter the prediction block and pixels adjacent to the prediction block and included in a previously decoded region which is adjacent to the current block, to remove blocking artifacts from the prediction block, with n filters determined from a natural image, and obtain a filtered prediction block; and a restoring unit configured to restore the current block with the filtered prediction block to a residual block of the current block, wherein the n filters are determined from the natural image based on a predetermined model, wherein the natural image is comprised of a number of patterns, the number of n filters corresponds to the number of patterns in the natural image, and the preprocessing unit repeatedly filtering the prediction block and the adjacent pixels with the n filters.

10. The apparatus of claim 9, wherein the n filters comprise at least one of a 3×3 filter and a 5×5 filter.

\* \* \* \* \*